US009582670B2

United States Patent
Feng

(10) Patent No.: US 9,582,670 B2
(45) Date of Patent: Feb. 28, 2017

(54) DATA STORAGE DEVICE AND DATA SCRAMBLING AND DESCRAMBLING METHOD

(71) Applicant: VIA TECHNOLOGIES, INC., New Taipei (TW)

(72) Inventor: Lei Feng, Beijing (CN)

(73) Assignee: VIA TECHNOLOGIES, INC., New Taipei (TW)

( * ) Notice: Subject to any disclaimer, the term of this patent is extended or adjusted under 35 U.S.C. 154(b) by 272 days.

(21) Appl. No.: 14/463,991

(22) Filed: Aug. 20, 2014

(65) Prior Publication Data

US 2015/0227473 A1    Aug. 13, 2015

(30) Foreign Application Priority Data

Feb. 12, 2014  (CN) .......................... 2014 1 0048967

(51) Int. Cl.
| | | |
|---|---|---|
| G06F 21/60 | (2013.01) | |
| G06F 21/79 | (2013.01) | |
| G06F 21/85 | (2013.01) | |

(52) U.S. Cl.
CPC ............. G06F 21/602 (2013.01); G06F 21/79 (2013.01); G06F 21/85 (2013.01)

(58) Field of Classification Search
None
See application file for complete search history.

(56) References Cited

U.S. PATENT DOCUMENTS

| | | | | |
|---|---|---|---|---|
| 6,252,958 B1* | 6/2001 | Rose | ..................... | H04L 9/0668 380/28 |
| 2005/0008150 A1* | 1/2005 | Liang | ..................... | G06F 21/72 380/28 |
| 2007/0067644 A1* | 3/2007 | Flynn | .................. | G06F 12/1408 713/189 |
| 2008/0072120 A1 | 3/2008 | Radke | | |
| 2008/0219448 A1* | 9/2008 | Almeida | ................. | H04L 9/065 380/277 |
| 2011/0035539 A1* | 2/2011 | Honda | ................ | G06F 11/1068 711/103 |
| 2011/0072276 A1* | 3/2011 | Lee | ......................... | G06F 21/80 713/189 |

(Continued)

FOREIGN PATENT DOCUMENTS

| | | |
|---|---|---|
| TW | 201335756 | 9/2013 |
| WO | WO 2009/088920 | 7/2009 |

*Primary Examiner* — Kaveh Abrishamkar
(74) *Attorney, Agent, or Firm* — McClure, Qualey & Rodack, LLP

(57) ABSTRACT

A data scrambling and descrambling technology based on logical addresses. A data storage device with the data scrambling and descrambling technology includes a non-volatile memory and a controller. The controller generates a data scrambling seed according to a logical writing address issued from the host, scrambles the write data issued from the host with the data scrambling seed and then stores the scrambled write data into the non-volatile memory. The controller further generates a data descrambling seed according to a logical reading address issued from the host, and descrambles the read data retrieved from the non-volatile memory by the data descrambling seed. The controller further processes the descrambled read data for data checking and correction.

12 Claims, 4 Drawing Sheets

(56) References Cited

U.S. PATENT DOCUMENTS

| | | | |
|---|---|---|---|
| 2013/0013934 A1* | 1/2013 | King | G06F 21/79 |
| | | | 713/190 |
| 2013/0103917 A1 | 4/2013 | Gupta | |
| 2013/0117577 A1* | 5/2013 | Hars | G06F 12/1408 |
| | | | 713/190 |
| 2013/0124784 A1* | 5/2013 | Woo | G06F 12/0246 |
| | | | 711/103 |

* cited by examiner

DATA STORAGE DEVICE AND DATA SCRAMBLING AND DESCRAMBLING METHOD

CROSS REFERENCE TO RELATED APPLICATIONS

This Application claims priority of China Patent Application No. 201410048967.7, filed on Feb. 12, 2014, the entirety of which is incorporated by reference herein.

BACKGROUND OF THE INVENTION

Field of the Invention

The present invention relates to data scrambling/descrambling technology and data storages using the same.

Description of the Related Art

Data scrambling/descrambling is commonly used in sensitive data protection. The generation of data scrambling/descrambling seeds is an important issue in this field.

BRIEF SUMMARY OF THE INVENTION

A data scrambling/descrambling technology based on logical addresses and a data storage device with the data scrambling/descrambling technology are disclosed.

A data storage device in accordance with an exemplary embodiment of the disclosure includes a non-volatile memory and a controller. The controller generates a data scrambling seed according to a logical writing address issued from a host, scrambles write data issued from the host with the data scrambling seed and writes the scrambled write data into the non-volatile memory. According to a logical reading address issued from the host, the controller generates a data descrambling seed and descrambles read data retrieved from the non-volatile memory by the data descrambling seed. The controller further processes the descrambled read data for data checking and correction.

A data scrambling/descrambling method in accordance with an exemplary embodiment of the disclosure is shown, which includes the following steps: generating a data scrambling seed according to a logical writing address issued from a host, scrambling write data issued from the host with the data scrambling seed, writing the scrambled write data into the non-volatile memory; generating a data descrambling seed according to a logical reading address issued from the host, descrambling read data retrieved from the non-volatile memory by the data descrambling seed, and processing the descrambled read data for data checking and correction.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
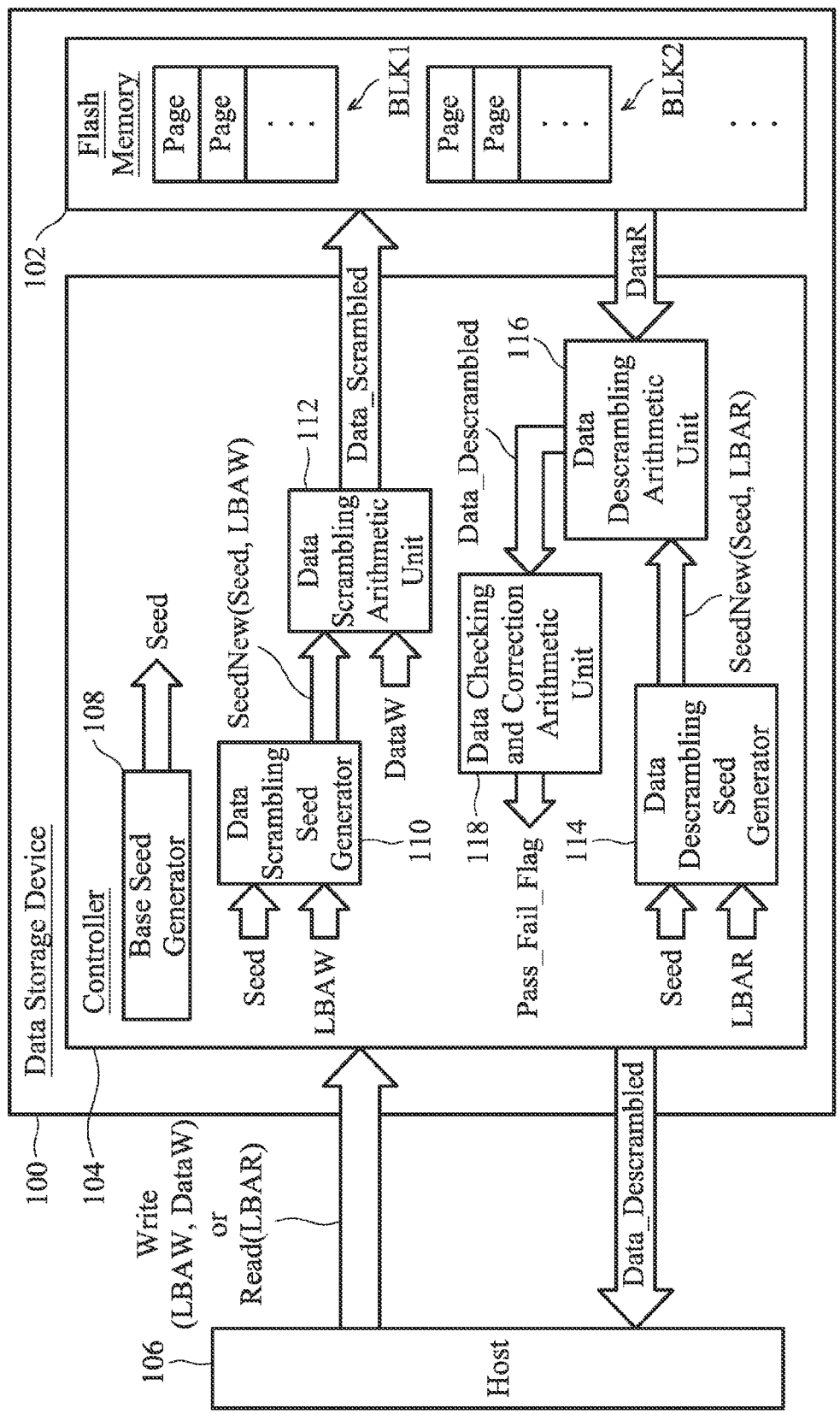
FIG. 1 depicts a data storage device 100 in accordance with an exemplary embodiment of the disclosure.

FIG. 1 depicts a data storage device 100 in accordance with an exemplary embodiment of the disclosure, which comprises a non-volatile memory and a controller 104. The non-volatile memory is implemented by a flash (non-volatile) memory 102. The controller 104 operates the flash memory 102 in accordance with the requests issued from a host 106. For example, the host 106 may issue a write command Write (LBAW, DataW) to store write data DataW corresponding to a logical writing address LBAW into the flash memory 102. The write command Write (LBAW, DataW) comprises the logical writing address LBAW and the write data DataW. The host 106 may issue a read command Read(LBAR) to read the flash memory 102 for retrieving read data corresponding to the logical reading address LBAR. The read command Read (LBAR) comprises the logical reading address LBAR. According to the logical writing address LBAW, the controller 104 generates a data scrambling seed based on the logical writing address LBAW to scramble the write data DataW using the data scrambling seed and writes the write data DataW scrambled by the data scrambling seed into the flash memory 102. According to the logical reading address LBAR, the controller 104 generates a data descrambling seed, and descrambles read data DataR retrieved from the flash memory 102 using the data descrambling seed. The controller 104 further processes the descrambled read data (Data_Descrambled) for data checking and correction.

As shown in the exemplary embodiment of FIG. 1, the storage space of the flash memory 102 is divided into blocks, e.g., BLK1, BLK2 and so on. Each block is further divided into pages. An erase operation designed for the flash memory 102 to release space for reuse is performed on a block-by-block basis, to release space of one block at a time. Each page may be allocated to correspond to a logical address. Thus, each page corresponds to one logical writing address LBAW or one logical reading address LBAR. For example, each page (including 4K bytes) of the flash memory 102 may be addressed by a logical reading/writing address. Thus the data scrambling/descrambling process may be performed on a 4 KB-by-4 KB basis.

Referring to FIG. 1, the controller 104 includes a base seed generator 108, a data scrambling seed generator 110, a data scrambling arithmetic unit 112, a data descrambling seed generator 114, a data descrambling arithmetic unit 116 and a data checking and correction arithmetic unit 118.

The base seed generator 108, e.g. a random number generator, is provided for base seed (Seed) generation. In an exemplary embodiment, the base seed generator 108 generates base seeds for the different pages, separately.

The data scrambling seed generator 110 combines the base seed Seed with the logical writing address LBAW to generate a data scrambling seed SeedNew(Seed, LBAW). In an exemplary embodiment, each data byte of the base seed Seed is paired with one byte of the logical writing address LBAW to calculate the data scrambling seed SeedNew (Seed, LBAW). For example, exclusive-OR calculations are performed on the data bytes of the base seed Seed and address bytes of the logical writing address LBAW pair by pair and thereby the data scrambling seed SeedNew(Seed, LBAW) is generated.

The data scrambling arithmetic unit 112 scrambles the write data DataW issued from the host 106 with the data scrambling seed SeedNew(Seed, LBAW) and thereby write data Data_Scrambled scrambled with the data scrambling seed SeedNew(Seed, LBAW) is generated to be stored into the flash memory 102.

The data descrambling seed generator 114 combines the base seed Seed with the logical reading address LBAR to generate a data descrambling seed SeedNew(Seed, LBAR). In an exemplary embodiment, each data byte of the base seed Seed is paired with one address byte of the logical reading address LBAR to calculate the data descrambling seed SeedNew(Seed, LBAR). For example, exclusive-OR calculations are performed on the data bytes of the base seed Seed and address bytes of the logical reading address LBAR pair by pair and thereby the data descrambling seed SeedNew(Seed, LBAR) is generated.

The data descrambling arithmetic unit 116 descrambles the read data DataR retrieved from the flash memory 102 by the data descrambling seed SeedNew(Seed, LBAR) and thereby descrambled read data Data_Descrambled is generated. Generally, the data descrambling arithmetic unit 116 performs a reverse calculation in comparison with the calculation performed by the data scrambling arithmetic unit 112.

The data checking and correction arithmetic unit 118 checks and corrects (e.g. by performing an ECC process) the descrambled read data Data_Descrambled to determine whether a read operation has failed. The result of the data checking and correction process may be indicated by a flag Pass_Fail_Flag. The descrambled read data Data_Descrambled that has been checked or successfully corrected is transmitted to the host 106. Furthermore, during the data checking and correction process, it may be further determined whether the data retrieved from the flash memory 102 is data corresponding to the logical reading address LBAR. When the descrambled read data Data_Descrambled is not the data requested according to the logical reading address LBAR (mismatch), the flash Pass_Fail_Flag is asserted to inform the host 106 that an uncorrectable error has happened.

Note that the logical reading address LBAR requested in the read command Read(LBAR) is also taken into account in the generation of the data descrambling seed SeedNew (Seed, LBAR). Thus, when the read data DataR is erroneously retrieved from another space rather than the space corresponding to the logical reading address LBAR, the reading error is perceived by the data checking and correction arithmetic unit 118. The read data DataR not corresponding to the logical reading address LBAR is disrupted by the data descrambling seed SeedNew(Seed, LBAR) as the descrambled read data Data_Descrambled and therefore the data checking and correction process performed on the descrambled read data Data_Descrambled that has been disrupted by the data descrambling seed SeedNew(Seed, LBAR) fails. The error that occurred in reading the flash memory 102, therefore, is perceived.

Figure 2:
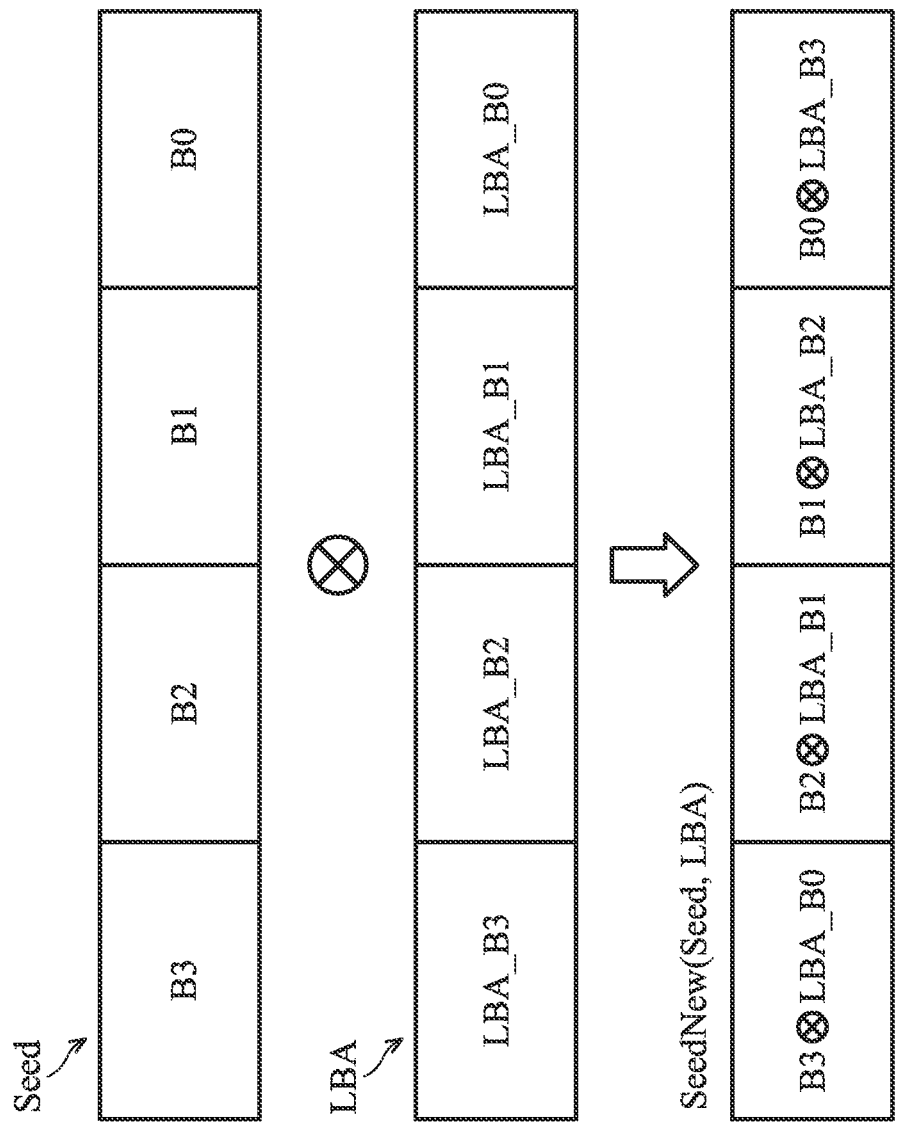
FIG. 2 depicts the generation of data scrambling/descrambling seeds in accordance with an exemplary embodiment of the disclosure.

FIG. 2 illustrates how a data scrambling or descrambling seed, e.g., the aforementioned data scrambling seed Seed-New(Seed, LBAW) or data descrambling seed SeedNew (Seed, LBAR), is generated. A base seed (Seed) including 4 bytes of digital data B3, B2, B1 and B0 (from the most significant byte to the least significant byte) is shown. Note that a generated base seed is designed for space of one page of the flash memory 102. A logical address LBA (e.g., the logical writing address LBAW or the logical reading address LBAR) may be represented by 4 bytes of address digits LBA_B3, LBA_B2, LBA_B1 and LBA_B0, from the most significant byte to the least significant byte. Each page (4 KB) of the flash memory 102 may be addressed by a logical address LBA. For each 4 KB of data, the controller 104 may perform an exclusive-OR operation on the base seed Seed with the logical address LBA corresponding to the 4 KB of data and thereby generates the data scrambling/descrambling seed SeedNew(Seed, LBA) for the 4K bytes of data. As shown in FIG. 2, the least significant byte LBA_B0, the second-least significant byte LBA_B1, the third-least significant byte LBA_B2 and the most significant byte LBA_B of the logical address LBA are paired with the most significant byte B3, the second-most significant byte B2, the third-most significant byte B3 of the base seed Seed to respectively do exclusive-OR calculations. Thus, the data scrambling/descrambling seed including 4 bytes is generated, comprising the most significant byte $B3^{x}LBA\_B0$, the second-most significant byte $B2^{x}LBA\_B1$, the third-most significant byte $B1^{x}LBA\_B2$ and the least significant byte $B0^{x}LBA\_B3$.

It is not intended to limit the generation of data scrambling/descrambling seed to SeedNew(Seed, LBA) depicted in FIG. 2. Any data scrambling/descrambling seed generated based on the logical address issued from the host 106 is workable. Furthermore, the flash memory may be replaced by other non-volatile memories.

Furthermore, the controller 104 implemented as a chip comprising a plurality of arithmetic units as shown in FIG. 1 may be replaced by a processor and a read only memory (ROM) containing firmware codes corresponding to the arithmetic units of FIG. 1 and executed by the processor. Any technique using the aforementioned concept to scramble/descramble data is within the scope of the invention. In an exemplary embodiment, a data scrambling/descrambling method is shown.

Figure 3:
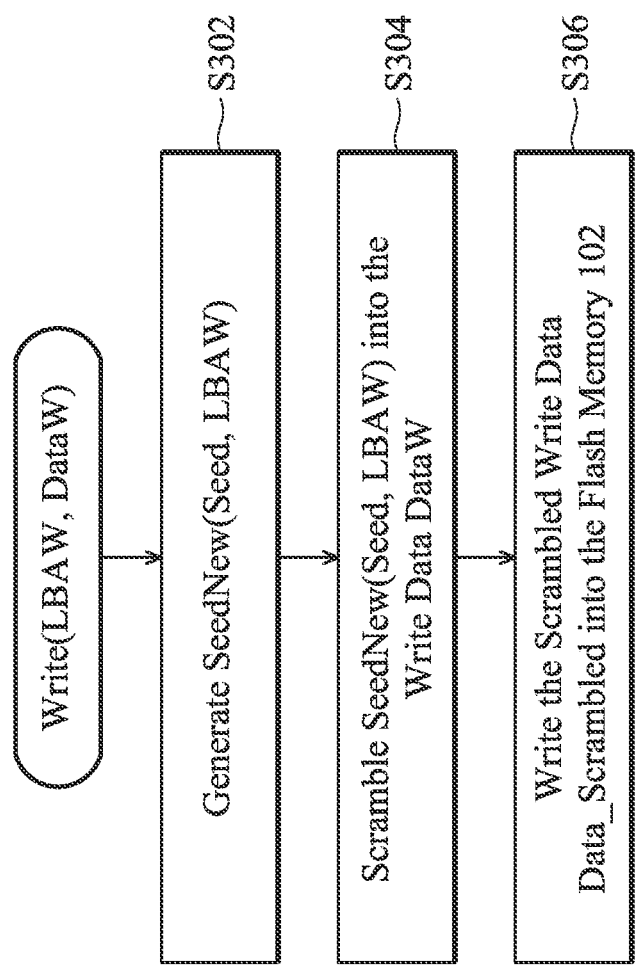
FIG. 3 is a flowchart depicting a data scrambling process in accordance with an exemplary embodiment of the disclosure.

FIG. 3 is a flowchart depicting a data scrambling processes in accordance with an exemplary embodiment of the disclosure. As for a write command Write(LBAW, DataW), a data scrambling seed SeedNew(Seed, LBAW) is generated in step S302. The logical writing address LBAW is taken into account in the generation of the data scrambling seed SeedNew(Seed, LBAW). In step S304, the write data DataW issued from the host 106 is scrambled with the data scrambling seed SeedNew(Seed, LBAW) to generate the scrambled write data Data_Scrambled. In step S306, the scrambled write data Data_Scrambled is written into the flash memory 102.

Figure 4:
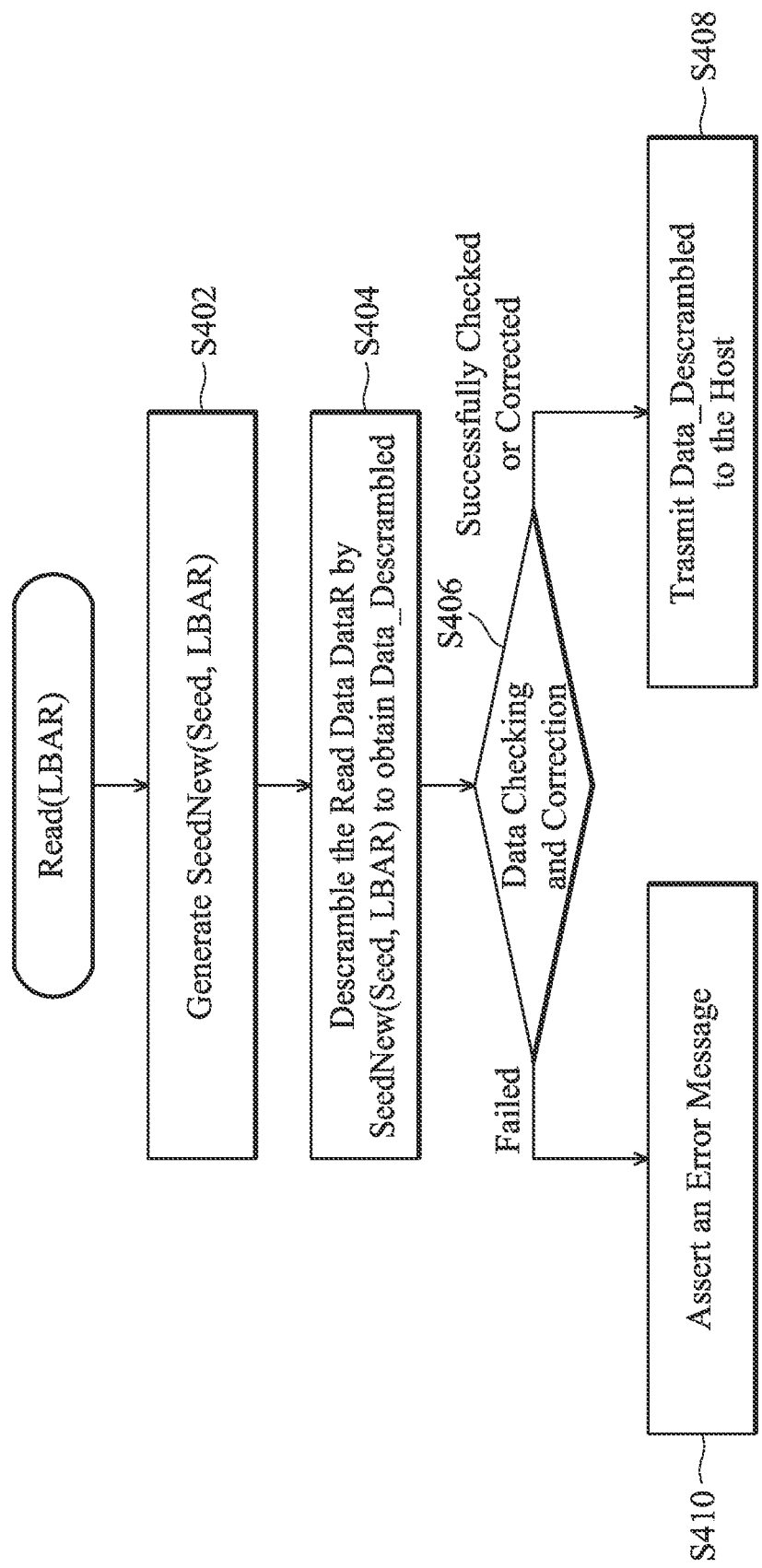
FIG. 4 is a flowchart depicting a data descrambling process and a data checking and correction process in accordance with an exemplary embodiment of the disclosure.

FIG. 4 is a flowchart depicting how the read data is descrambled and checked and corrected. As for a read command Read(LBAR) issued from the host 106, a data descrambling seed SeedNew(Seed, LBAR) is generated in step S402 based on the logic reading address LBAR. In step S404, the read data DataR retrieved from the flash memory 102 is descrambled by the data descrambling seed SeedNew (Seed, LBAR) and thereby a descrambled read data Data_Descrambled is obtained. In step S406, a data checking and correction process is performed on the descrambled read data Data_Descrambled to determine whether an error occurs when reading the flash memory 102 according to the logical address LBAR requested in the read command Read(LBAR). When the data checking and correction process is successfully performed on the descrambled read data Data_Descrambled, step S408 is performed to transmit the descrambled read data Data_Descrambled to the host 106. When the descrambled read data Data_Descrambled fails to complete the data checking and correction process, step S410 is performed to assert an error message showing a read problem in the flash memory 102.

While the invention has been described by way of example and in terms of the embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, generating a data scrambling seed in accordance with a logical writing address included in a write command issued from a host to scramble write data included in the write command issued from the host with the data scrambling seed, writing the scrambled write data into the non-volatile memory, and generating a data descrambling seed in accordance with a logical reading address included in a read command issued from the host to descramble read data retrieved from the non-volatile memory by the data descrambling seed,
wherein:
the controller further processes the descrambled read data for data checking and correction.

2. The data storage device as claimed in claim 1, wherein according to the data checking and correction the controller determines whether the read data is actually corresponding to the logical reading address.

3. The data storage device as claimed in claim 1, wherein:
the controller further generates a base seed;
the controller combines the base seed with the logical writing address to generate the data scrambling seed; and
the controller combines the base seed with the logical reading address to generate the data descrambling seed.

4. The data storage device as claimed in claim 3, wherein:
the controller generates the data scrambling seed by performing calculations on the base seed and the logical writing address byte by byte, wherein each data byte of the base seed is paired with one address byte of the logical writing address; and
the controller generates the data descrambling seed by performing calculations on the base seed and the logical reading address byte by byte, wherein each data byte of the base seed is paired with one address byte of the logical reading address.

5. The data storage device as claimed in claim 1, wherein:
the non-volatile memory is a flash memory with storage space divided into a plurality of blocks, each comprising a plurality of pages; and
the logical writing address or the logical reading address indicates one of the pages.

6. The data storage device as claimed in claim 1, wherein:
the controller further generates a base seed, and the base seed comprises 4 bytes of digital data;
the logical writing address is represented by 4 bytes of address digits and the logical reading address is represented by 4 bytes of address digits;
by the controller, a least significant byte of the logical writing address is exclusive-ORed with a most significant byte of the base seed, a second-least significant byte of the logical writing address is exclusive-ORed with a second-most significant byte of the base seed, a third-least significant byte of the logical writing address is exclusive-ORed with a third-most significant byte of the base seed and a most significant byte of the logical writing address is exclusive-ORed with a least significant byte of the base seed to generate a most significant byte, a second-most significant byte, a third-most significant byte and a least significant byte of the data scrambling seed, respectively; and
by the controller, a least significant byte of the logical reading address is exclusive-ORed with a most significant byte of the base seed, a second-least significant byte of the logical reading address is exclusive-ORed with a second-most significant byte of the base seed, a third-least significant byte of the logical reading address is exclusive-ORed with a third-most significant byte of the base seed and a most significant byte of the logical reading address is exclusive-ORed with a least significant byte of the base seed to generate a most significant byte, a second-most significant byte, a third-most significant byte and a least significant byte of the data descrambling seed, respectively.

7. A data scrambling and descrambling method, comprising:
generating a data scrambling seed in accordance with a logical writing address included in a write command issued from a host to scramble write data included in the write command issued from the host with the data scrambling seed;
writing the scrambled write data into a non-volatile memory;
generating a data descrambling seed in accordance with a logical reading address included in a read command issued from the host to descramble read data retrieved from the non-volatile memory by the data descrambling seed; and
processing the descrambled read data for data checking and correction.

8. The data scrambling and descrambling method as claimed in claim 7, further comprising:
determining whether the read data is actually corresponding to the logical reading address based on the data checking and correction.

9. The data scrambling and descrambling method as claimed in claim 7, further comprising:
generating a base seed; combining the base seed with the logical writing address to generate the data scrambling seed; and
combining the base seed with the logical reading address to generate the data descrambling seed.

10. The data scrambling and descrambling method as claimed in claim 9, wherein:
the data scrambling seed is generated by performing calculations on the base seed and the logical writing address byte by byte, and each data byte of the base seed is paired with one address byte of the logical writing address; and
the data descrambling seed is generated by performing calculations on the base seed and the logical reading address byte by byte, and each data byte of the base seed is paired with one address byte of the logical reading address.

11. The data scrambling and descrambling method as claimed in claim 7, wherein:
   the non-volatile memory is a flash memory with storage space divided into a plurality of blocks, each comprising a plurality of pages; and
   the logical writing address or the logical reading address indicates one of the pages.

12. The data scrambling and descrambling method as claimed in claim 7, further comprising:
   generating a base seed that comprise 4 bytes of digital data;
   representing the logical writing address by 4 bytes of address digits and representing the logical reading address by 4 bytes of address digits;
   exclusive-ORing a least significant byte of the logical writing address with a most significant byte of the base seed, a second-least significant byte of the logical writing address with a second-most significant byte of the base seed, a third-least significant byte of the logical writing address with a third-most significant byte of the base seed and a most significant byte of the logical writing address with a least significant byte of the base seed to generate a most significant byte, a second-most significant byte, a third-most significant byte and a least significant byte of the data scrambling seed, respectively; and
   exclusive-ORing a least significant byte of the logical reading address with a most significant byte of the base seed, a second-least significant byte of the logical reading address with a second-most significant byte of the base seed, a third-least significant byte of the logical reading address with a third-most significant byte of the base seed and a most significant byte of the logical reading address with a least significant byte of the base seed to generate a most significant byte, a second-most significant byte, a third-most significant byte and a least significant byte of the data descrambling seed, respectively.

* * * * *